Jan. 10, 1933.                W. KLOTZ                1,893,948
                         DOOR KEY ATTACHMENT
                         Filed Nov. 11, 1930
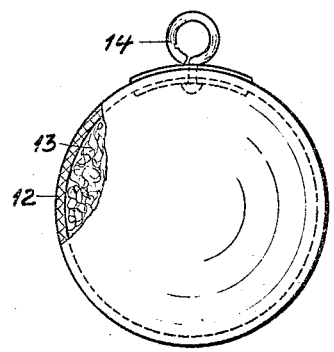
Wilhelm Klotz
by Dund Rines,
    Attorney.

Patented Jan. 10, 1933

1,893,948

UNITED STATES PATENT OFFICE

WILHELM KLOTZ, OF DUSSELDORF, GERMANY

DOOR-KEY ATTACHMENT

Application filed November 11, 1930, Serial No. 494,910, and in Germany January 1, 1930.

I have filed applications in: Germany filed the 1st January 1930, France filed the 4th July 1930, Belgium filed the 7th July 1930, Switzerland filed the 14th February 1930.

Door-key attachments for hotels and the like are usually made of wood or such like hard material and of a sufficiently large size to prevent the key from being carried away in the pocket by mistake. The use of key attachments of this kind has many disadvantages, however, the most serious of which are the unavoidable damage to the painted wood of the doors and the disturbing noise when they hit against the door or any hard object.

The present invention consists of a key attachment in which the drawbacks above mentioned are absent.

According to the invention, the key attachments are provided with elastic buffer surfaces. These can be designed in such a way that the entire attachment is made of rubber only, or formed as a hollow rubber body. Alternatively it may take the form of a more or less hard core covered with a rubber coating.

The single figure of the annexed drawing is an elevation, partly in longitudinal section, of a preferred embodiment of the present invention.

The key attachment of the present invention consists entirely of rubber or like substance. The shape may be of any form that may be desired, but is illustrated as of spherical form, comprising a rubber ball 12 which can be left hollow or can be stuffed with a filling 13 of spongy rubber, cellular rubber (known also as "sorbo") or scrap rubber or other like material. The spherical shape provides a hand grip. The eyelets 14 can be fixed in any way desired.

The rubber body can be marked by moulding, stamping or otherwise indicating the number of the room as well as the name of the firm.

What I claim is:—

Door-key attachment consisting of a hollow rubber ball having a stuffing of spongy rubber, sorbo or scrap rubber or similar elastic material, and an eyelet attached thereto.

WILHELM KLOTZ.